US010801911B2

(12) United States Patent
Oblizajek (10) Patent No.: US 10,801,911 B2
(45) Date of Patent: Oct. 13, 2020

(54) WHEEL AND TIRE ASSEMBLY UNIFORMITY

(71) Applicant: GM GLOBAL TECHNOLOGY OPERATIONS LLC, Detroit, MI (US)

(72) Inventor: Kenneth L. Oblizajek, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 83 days.

(21) Appl. No.: 16/295,129

(22) Filed: Mar. 7, 2019

(65) Prior Publication Data

US 2020/0284682 A1 Sep. 10, 2020

(51) Int. Cl.
*G01M 1/36* (2006.01)
*G01M 1/30* (2006.01)

(52) U.S. Cl.
CPC ............... *G01M 1/36* (2013.01); *G01M 1/30* (2013.01)

(58) Field of Classification Search
CPC ......... B60B 2320/30; B60B 2900/131; G01M 1/16; G01M 1/28; G01M 1/30; G01M 1/36
See application file for complete search history.

(56) References Cited

U.S. PATENT DOCUMENTS

| | | | | | |
|---|---|---|---|---|---|
| 4,817,429 A | * | 4/1989 | Goebel | ................. | G01M 17/02 73/459 |
| 2009/0301192 A1 | * | 12/2009 | Douglas | .............. | G01M 17/022 73/460 |

OTHER PUBLICATIONS

Julius S. Bendat, Allan G. Piersol, "Random Data, Analysis and Measurement Procedures", 2nd Edition, Chapter 7: Multiple-Input/ Output Relationships, Sec 7.4.2 Multiple-Input/Single-Output Model to Sec 7.4.3 Model with Output Noise, pp. 244-248, 1986, Wiley-Interscience, John Wiley & Sons, ISBN 0-471-04000-2.

* cited by examiner

*Primary Examiner* — Matthew P Travers
(74) *Attorney, Agent, or Firm* — Reising Ethington P.C.

(57) ABSTRACT

Methods and systems for installing tires to corresponding wheels are disclosed. An example method includes measuring non-uniformity of a first assembled tire and wheel at three or more different relative rotational positions to determine corresponding measurements of non-uniformity according to a predetermined metric, and determining that each of the measurements are above a predetermined non-uniformity limit. A rotationally relative installation position for the tire on the wheel may be determined using at least these measurements, with the position of the tire relative to the wheel in the rotationally relative installation position being different from each of the first, second, and third relative rotational positions. In examples where at least a second tire/wheel combination is measured below the non-uniformity threshold, installation of the second tire/wheel may conclude at the position where the assembled tire/wheel is measured below the non-uniformity threshold.

19 Claims, 3 Drawing Sheets

WHEEL AND TIRE ASSEMBLY UNIFORMITY

INTRODUCTION

Motor vehicles typically use pneumatic tires which are installed to a metallic wheel. Manufacturing and other variations in the production of tires and wheels causes various inconsistencies in roundness, size, thickness, geometric characteristics of components, material properties, etc. These inconsistencies result in variances of the assembled tire and wheel. As the assembled tire/wheel rotates during vehicle operation, these variances may cause the assembled tire/wheel to impart periodic forces to the vehicle, especially in an up/down or vertical orientation with respect to the vehicle.

In one approach to reducing variances in assembled tires and wheels, tires and wheels may be "match-mounted" by positioning the tire on the wheel such that an angular location of a relatively large radial force of the tire is positioned radially on top of a relatively low point in the outer radius of the wheel. In other words, in theory any relatively high radial force of the tire and low radial runout of the wheel are overlaid and thus "matched," in an effort to reduce overall variance in the assembled tire and wheel.

At best, however, match-mounting inconsistently addresses variance, such as where variance of the tire is much more significant than the wheel, or vice versa. Moreover, the process of installing tires to the wheels also introduces variances which have themselves been found in many cases to be at least as significant as those present in the tire and wheel individually.

Accordingly, there is a need for an improved method and/or system of installing a tire to a wheel that addresses the above shortcomings.

SUMMARY

In at least some example implementations, a method of installing tires to corresponding wheels includes measuring non-uniformity of a first assembled tire and wheel with the tire positioned relative to the wheel at a first relative rotational position to determine a first measurement of non-uniformity according to a predetermined metric, determining that the first measurement is above a predetermined non-uniformity limit, and based upon that determination, rotating the tire with respect to the wheel to a second relative rotational position. The method may further include measuring the non-uniformity of the assembled tire and wheel with the tire positioned relative to the wheel at the second relative rotational position to determine a second measurement of non-uniformity according to the predetermined metric, determining that the second measurement is above the predetermined non-uniformity limit, and based upon that determination, rotating the tire with respect to the wheel to at least a third relative rotational position. Each of the first, second, and at least third relative rotational positions of the tire may be at different locations about the wheel. The method may also include measuring the non-uniformity of the assembled tire and wheel with the tire positioned relative to the wheel at the at least third relative rotational position(s) to determine at least a third measurement of non-uniformity according to the predetermined metric, and determining that the third measurement is above the predetermined radial non-uniformity limit. The method may also include installing the tire on the wheel at a rotationally relative installation position determined from at least the first, second, and third measurements, the position of the tire relative to the wheel in the rotationally relative installation position being different from each of the first, second, and third relative rotational positions.

In at least some examples, the predetermined metric is a metric of radial non-uniformity.

The predetermined metric may be, in at least some example approaches, one of a runout distance of the assembly in a radial direction of the tire, a radial force variation (RFV) measured while the assembly is rotated, a lateral force variation (LFV) measured while the assembly is rotated, a fore-aft force variation (FFV) measured while the assembly is rotated, and a rolling radius variation measured while the assembly is rotated.

In some examples, measurement of non-uniformity of at least a second assembled tire and wheel may be concluded by determining that one of the measurements of radial non-uniformity of the second tire and wheel is below the predetermined radial non-uniformity limit.

In some example approaches, the determining of the rotationally relative installation position comprises determining an angular orientation of the tire on the wheel corresponding to a calculated lowest non-uniformity determined from at least each of the predetermined number of measurements.

In at least some examples, the first, second, and third relative rotational positions are spaced substantially equally about the circumference of the wheel.

Some example methods may further include determining a wheel contribution to the determined non-uniformity, a tire contribution to the determined non-uniformity, and a wheel-tire assembly contribution.

Installing the tire on the wheel at the rotationally relative installation position may, in some examples, include rotating the tire with respect to the wheel. In other examples, installing the tire on the wheel at the rotationally relative installation position includes deflating the tire and rotating the tire around the wheel without de-beading the tire from the wheel.

In some examples, the determining of the rotationally relative installation position comprises determining an angular orientation of the tire on the wheel corresponding to a calculated lowest non-uniformity determined from at least each of the first, second, and third measurements.

In another example method of installing tires to corresponding wheels a radial non-uniformity of a first assembled tire and wheel is measured with the tire positioned relative to the wheel at a first relative rotational position to determine a first measurement of radial non-uniformity according to a predetermined metric. The method may further include determining that the first measurement is above a predetermined non-uniformity limit, and based upon that determination, rotating the tire with respect to the wheel to a second relative rotational position. The method may also include measuring the radial non-uniformity of the assembled tire and wheel with the tire positioned relative to the wheel at the second relative rotational position to determine a second measurement of radial non-uniformity according to the predetermined metric, determining that the second measurement is above the predetermined non-uniformity limit, and based upon that determination, rotating the tire with respect to the wheel to at least a third relative rotational position. Each of the first, second, and at least third relative rotational positions of the tire may be at different locations about the wheel. In this example, the method may further include measuring the radial non-uniformity of the assembled tire and wheel with the tire positioned relative to the wheel at the third relative rotational position to determine at least a third measurement of radial non-uniformity according to the predetermined metric, and determining that the third measurement is above the predetermined radial non-uniformity limit. The method may further include installing the tire on the wheel at a rotationally relative installation position determined from at least the first, second, and third measurements, the position of the tire relative to the wheel in the rotationally relative installation position being different from each of the first, second, and third relative rotational positions.

In at least some examples, the predetermined metric is one of a runout distance of the tire in a radial direction of the tire and a radial force variation (RFV) measured while the tire is rotated.

Some example methods may include concluding measuring the non-uniformity of at least a second assembled tire and wheel by determining that one of the measurements of radial non-uniformity of the second tire and wheel is below the predetermined radial non-uniformity limit.

The first, second, and third relative rotational positions, in some examples, may be spaced substantially equally about the circumference of the wheel.

In at least some example methods, the determining of the rotationally relative installation position comprises determining an angular orientation of the tire on the wheel corresponding to a calculated lowest non-uniformity determined from at least each of the first, second, and third measurements.

In some examples, installing the tire on the wheel at the rotationally relative installation position includes rotating the tire with respect to the wheel.

In another example method of installing tires to corresponding wheels, the method includes measuring non-uniformity of a first assembled tire and wheel with the tire positioned relative to the wheel at a first relative rotational position to determine a first measurement of non-uniformity according to a predetermined metric, determining that the first measurement is above a predetermined non-uniformity limit, and based upon that determination, rotating the tire with respect to the wheel to a second relative rotational position. The method may further include measuring the non-uniformity of the assembled tire and wheel with the tire positioned relative to the wheel at the second relative rotational position to determine a second measurement of non-uniformity according to the predetermined metric, determining that the second measurement is above the predetermined non-uniformity limit, and based upon that determination, rotating the tire with respect to the wheel to at least a third relative rotational position. Each of the first, second, and at least third relative rotational positions of the tire may be at different locations about the wheel. The method may also include measuring the non-uniformity of the assembled tire and wheel with the tire positioned relative to the wheel at the at least third relative rotational position(s) to determine at least a third measurement of non-uniformity according to the predetermined metric, and determining that the third measurement is above the predetermined radial non-uniformity limit. The method may also include installing the tire on the wheel at a rotationally relative installation position determined from at least the first, second, and third measurements, the position of the tire relative to the wheel in the rotationally relative installation position being different from each of the first, second, and third relative rotational positions. The method may also include measuring non-uniformity of at least a second assembled tire and wheel, and concluding measuring the non-uniformity of at least a second assembled tire and wheel by determining that one of the measurements of radial non-uniformity of the second tire and wheel is below the predetermined non-uniformity limit.

In some examples, the predetermined metric is a metric of radial non-uniformity, and the first, second, and third relative rotational positions are spaced substantially equally about the circumference of the wheel.

In at least some example methods, the predetermined metric is one of a runout distance of the assembly in a radial direction of the tire, a radial force variation (RFV) measured while the assembly is rotated, a lateral force variation (LFV) measured while the assembly is rotated, a fore-aft force variation (FFV) measured while the assembly is rotated, and a rolling radius variation measured while the assembly is rotated.

In at least some example approaches, the determining of the rotationally relative installation position comprises determining an angular orientation of the tire on the wheel corresponding to a calculated lowest non-uniformity determined from at least each of the predetermined number of measurements.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Example illustrations include methods of installing tires to corresponding wheels for a given wheel configuration (e.g., installing a series of tires to wheels in a single size/configuration or for a given vehicle design). Example methods may help reduce force variations in a tire/wheel assembly, particularly for a first-harmonic radial force variation or first harmonic content—i.e., sinusoidal force with a wavelength equal to the circumference of the tire observed over a single revolution of the assembled tire/wheel (referred to as "R1H"). Generally, example methods may, upon the determination that a tire/wheel assembly exceeds a given threshold for non-uniformity, rotate the tire on about the wheel to additional relative position(s) of the tire on the wheel. If the rotated tire/wheel assembly exceeds the non-uniformity threshold at each of the positions, a new installation position may be determined based upon the measurements of non-uniformity of the tire/wheel assembly at each of the positions. In some examples, at least three different positions are employed. In this manner, the tire may be installed on to the wheel at an orientation that minimizes non-uniformity to the extent possible, based upon the pattern of non-uniformity indicated by the measurements. At the same time, if an assembled wheel/tire is below a given metric for non-uniformity, the tire and wheel assembly may be finalized, i.e., without rotating the tire to other positions on the wheel. Accordingly, in examples directed to installation of a plurality of tires to corresponding wheels, wherever assembled tires and wheels are measured and found to be within a given tolerance or below a non-uniformity metric, additional measurements of non-uniformity are not needed and the tire/wheel assembly may be completed. On the other hand, if the assembled tire/wheel is over the tolerance or threshold for non-uniformity, additional measurements may be taken at different positions of the tire on the wheel, and ultimately a final installation position of the tire on the wheel may be determined from any measurement (s) taken.

Non-uniformity may be measured using any metric and in any manner that is convenient. For example, one metric that may be used is radial force variation (RFV), which can be directly measured on an RFV machine or inferred from tire tread runout measurements (e.g., prior to RFV measurement), merely as examples. Moreover, while the examples herein are specifically directed to radial non-uniformity, e.g., as indicated by RFV metrics, in other example approaches lateral forces or non-radial non-uniformities of an assembled tire/wheel may be addressed. In examples where lateral non-uniformity of the assembly 100 is addressed using methods described herein, it may be necessary to determine whether any lateral non-uniformity is overwhelmed by radial non-uniformities—this may be typical, as lateral non-uniformities tend to produce lower vibration concerns. Accordingly, the predetermined metric may be a runout distance of the assembly in a radial direction of the tire, a radial force variation (RFV) measured while the assembly is rotated, a lateral force variation (LFV) measured while the assembly is rotated, a fore-aft force variation (FFV) measured while the assembly is rotated, or a rolling radius variation measured while the assembly is rotated, merely as examples. Fore-aft forces may be measured at speeds higher than that of more conventional inspection machines typically operating at approximately 1 cycle per second (cps). Rolling radius is the ratio of incremental translational travel of the wheel center to angular rotation on a flat surface, representing roadway travel. On a typical measurement machine with a fixed spindle where the tire is rotating against a load reaction drum, rolling radius is the ratio of incremental contact drum rotation angle to incremental assembly rotation angle multiplied by the nominal radius of the contact drum.

Figure 1:
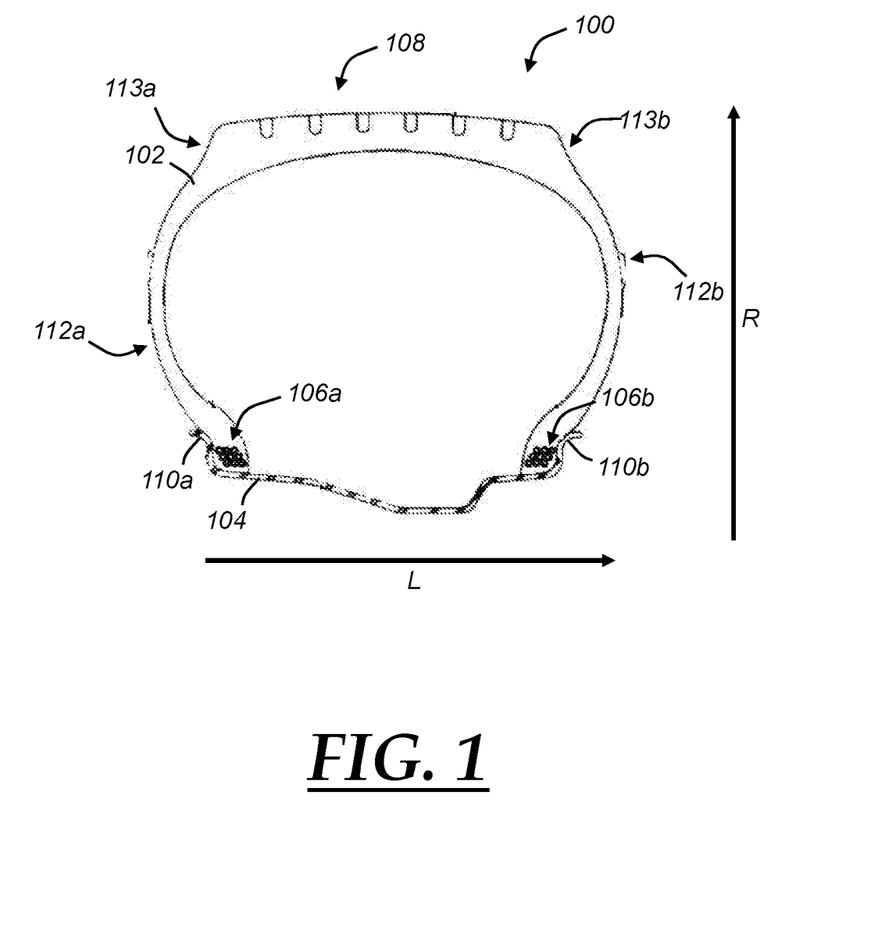
FIG. 1 is a perspective view of a tire installed upon a wheel for a vehicle, according to one example approach.

Turning now to FIG. 1, a section view of an example tire/wheel assembly 100 for use with a vehicle (not shown) is illustrated. The assembly 100 may include a tire 102 installed onto a wheel 104, of which the rim thereof is shown. The wheel 104 may include mounting holes (not shown) or any other mechanism for securing the assembly 100 to a hub of a vehicle.

The tire 102 may generally be a tubeless radial tire defining a tread 108 for engaging a ground surface. Laterally inner and outer sidewalls 112a, 112b may be joined to the tread 108 via shoulders 113a, 113b, respectively.

The tire 102 may be mounted to the wheel 104 by way of a laterally inner bead 106a and a laterally outer bead 106b (collectively, the inner and outer beads 106a, 106b may be referred to herein as beads 106). The tire 102 may be inflated such that the laterally inner bead 106a and laterally outer bead 106b engage with a corresponding laterally inner flange 110a and a laterally outer flange 110b of the wheel 104, respectively. Accordingly, the expansion of the tire 102 due to inflation maintains the tire 102 on the wheel 104. The tire 102 may be installed to the wheel 104 in any manner that is convenient.

As used herein, laterally outer may indicate a position that is laterally outward with respect to a vehicle onto which the assembly 100 is installed, while laterally inner may indicate a position that is laterally inward with respect to the vehicle. In FIG. 1, a lateral direction is indicated by arrow L, which is oriented to point in a laterally outward direction. A radial direction is generally perpendicular to the lateral direction, and is indicated by arrow R.

As noted above, after installation of the tire 102 to the wheel 104, the assembly 100 may be non-uniform. For example, due to manufacturing tolerances associated with manufacturing of the tire 102, wheel 104, installation of the tire 102 to the wheel 104, or other inconsistencies, a radius of the assembly 100 with respect to a wheel center (not shown in FIG. 1) may vary about a circumference of the assembly 100. Other examples of non-uniformities may include lateral variations in position of the tire 102 and/or wheel 104. To the extent non-uniformities in the assembly 100 may impart periodic forces to the vehicle while rotating, it is desirable to reduce them to the extent possible.

Figure 2A:
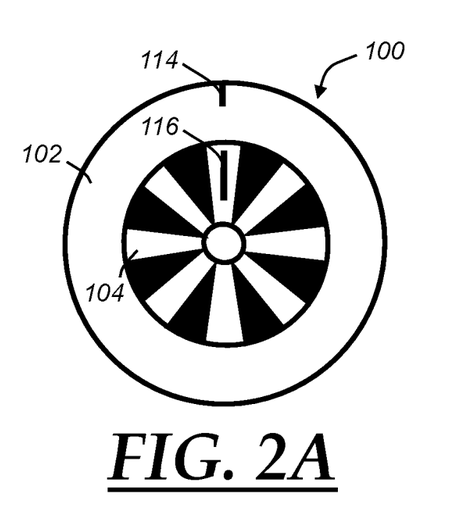
FIG. 2A is a schematic illustration of a tire installed to a wheel such as the example in FIG. 1, with the tire installed in a first relative rotational position with respect to the wheel.
Figure 2B:
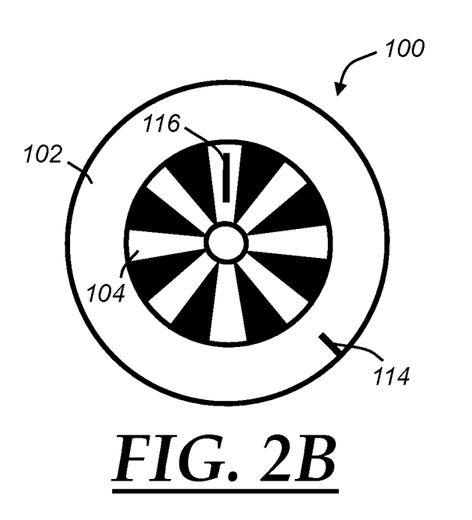
FIG. 2B is a schematic illustration of the tire and wheel of FIG. 2A, with the tire positioned on the wheel in a second relative rotational position with respect to the wheel.
Figure 2C:
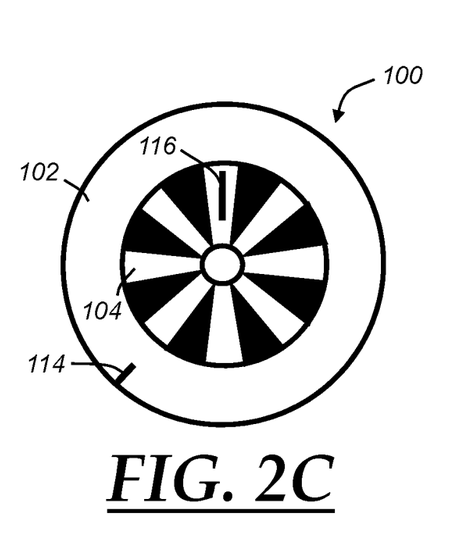
FIG. 2C is a schematic illustration of the tire and wheel of FIGS. 2A and 2B, with the tire positioned on the wheel in a third relative rotational position with respect to the wheel.

Turning now to FIGS. 2A-2D, the assembly 100 is illustrated with the tire 102 mounted in different relative rotational positions with respect to the wheel 104, e.g., as may be useful in example methods described below. A tire reference marker 114 and wheel reference marker 116 are used to indicate relative positioning of the tire 102 with respect to the wheel 104. More specifically, in FIG. 2A the tire 102 is in a first relative rotational position with respect to the wheel 104, such that the reference markers 114, 116 are generally aligned. In FIG. 2B, the tire 102 is in a second relative rotational position with respect to the wheel 104, such that the reference markers 114, 116 are angularly spaced apart by about 120 degrees. Similarly, FIG. 2C illustrates the tire 102 in a third relative rotational position with respect to the wheel 104 where the tire 102 has been rotated again with respect to the wheel 104 by approximately 120 degrees. In this manner, the three relative rotational positions illustrated in FIGS. 2A-2C are spaced substantially equally about a circumference of the wheel 104. However, equal or substantially equal spacing of the relative rotational positions is not required, as differences in position may be taken into account when non-uniformity of the assembly 100 is measured at each of the relative rotational positions.

In example illustrations herein, a minimum of three different relative rotational positions are employed in order to solve for three distinct variables with respect to the assembly 100. These variables may generally represent variance in the tire 102, variance in the wheel 104, and variance in the assembly process, i.e., in the process of mounting the tire 102 upon the wheel 104. As will be described further below, measuring non-uniformity at three distinct different relative rotational positions may generally facilitate solving for these three distinct variances, thereby allowing a determination to be made of a relative rotational position where overall non-uniformity resulting from these three variances is minimized.

Figure 2D:
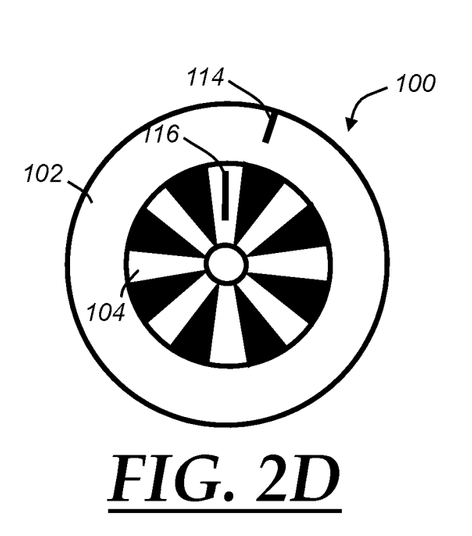
FIG. 2D is a schematic illustration of the tire and wheel of FIGS. 2A-2C, with the tire positioned on the wheel in another relative rotational position with respect to the wheel, which is different from each of the first, second, and third positions.

FIG. 2D illustrates the assembly 100 with the tire 102 rotated to a different relative rotational position with respect to the wheel 104. As will be described further below, a fourth relative rotational position may be determined based upon measurements of non-uniformity at each of the three relative rotational positions, in an effort to minimize non-uniformity of the assembly 100. Accordingly, in examples where non-uniformity is measured at each of the relative rotational positions illustrated in FIGS. 2A-2C and found to exceed a given threshold for non-uniformity (i.e., the assembly 100 is too far out-of-round, or the like), the tire 102 may be rotated with respect to the wheel 104 and installed at a new relative rotational position where estimated overall non-uniformity of the assembly 100 is minimized.

Figure 3:
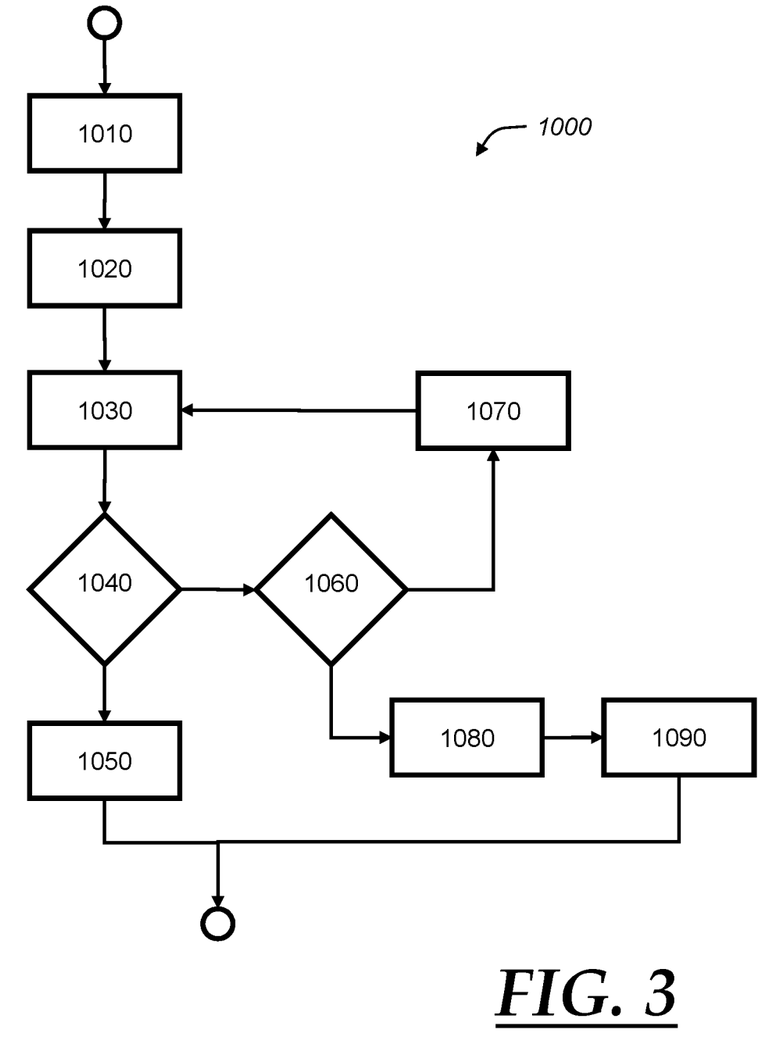
FIG. 3 is a process flow diagram for a method of installing tires to wheels, according to one example approach.

Turning now to FIG. 3, an example process flow diagram is illustrated for a process 1000 of installing one or more tires to corresponding wheel(s) for a vehicle. Process 300 may begin at block 1010, where a position variable n may be set to a number of desired relative rotational positions. As noted above, example illustrations preferably employ a minimum of three distinct relative rotational positions, and thus for the purposes of this example the variable n is set to three (3). Examples are not limited to using only three relative rotational positions, and as such four or more relative rotational positions may be employed in some example approaches.

Continuing with this example of three distinct relative rotational positions, at block 1020 a counting variable m may be initially set to the integer one (1). Process 1000 may then proceed to block 1030, where non-uniformity of the m position is measured according to a predetermined metric of non-uniformity. For example, radial runout of the tire tread 108 may be measured and used to infer non-uniformity, or a radial force variation (RFV) machine may be used to directly measure first-harmonic forces of the assembly 100 under rotation.

Proceeding to block 1040, process 1000 may query whether the non-uniformity measured of the m position exceeds a predetermined threshold of non-uniformity. Merely by way of example, if at the first relative rotational position (i.e., where m=1) an RFV machine determines that first harmonic content of the radial force is below an applicable threshold of non-uniformity further processing of the assembly 100 is not needed since the assembly 100 is already within applicable non-uniformity tolerances. In such cases, process 1000 may proceed to block 1050, where the installation of the tire 102 to the wheel at the m position is finalized. In one example, a typical threshold for non-uniformity may be a difference of 60 Newtons (N) in peak-to-peak of radial force for the assembled wheel and tire. In another example, a typical threshold for non-uniformity may be a difference of 0.25 millimeters (mm) in peak-to-peak radial runout of the assembled wheel and tire. Any other threshold for non-uniformity may be employed that is convenient. It should also be noted that a threshold may generally be determined in a same metric of non-uniformity in which measurements are taken at the relative rotational positions. For example, a force metric (e.g., a measured amount of peak-to-peak force variation during rotation of the assembly 100) may be employed, or a distance metric (e.g., a measured distance in peak-to-peak runout of the assembly 100 in a radial direction).

Alternatively, where block 1040 determines that the assembly 100 exceeds the threshold for non-uniformity, process 1000 may proceed to block 1060. Process 1000 is configured such that measurements are taken at each of the relative rotational positions, so long as the previous measurement taken indicates that the assembly 100 exceeds the applicable threshold for non-uniformity. More specifically, if at block 1060 process 1000 determines that the counting variable m is not equal to the position variable n, process 1000 proceed to block 1070. At block 1070, the counting variable m is incremented by the integer one (1), and process 1000 then proceeds back to block 1030, where the m position is measured according to the same non-uniformity metric. The second measurement may be taken at the second relative rotational position illustrated in FIG. 2B, the third measurement may be taken at the third relative rotational position illustrated in FIG. 2C, etc. Prior to taking the second and any subsequent measurements at block 1030, the tire 102 may be rotated relative to the wheel 104 in any manner that is convenient. Merely as examples, the tire 102 may be de-beaded from the wheel 104 entirely, or simply loosened from the wheel 104, e.g., by deflating, merely as examples, thereby allowing the rotational position of the tire 102 to be changed with respect to the wheel 104. Inconsistencies of bead seating between the tire 102 and the rim of the wheel 104 may contribute to non-uniformity (e.g., radial force variation) of the assembly 100, and thus to the extent this is believed to be true for a given assembly 100, it may be desirable to employ a controlled process of loosening or de-beading, and re-installing of the tire 102, with respect to the wheel 104. Rotations of the tire 102 about the wheel 104 may be accomplished at a machine where measurement of non-uniformity takes place, e.g., at an RFV machine or radial runout measurement station, or in a distinct operation before the assembly 100 is moved to a station for measurement of non-uniformity.

Accordingly, the process 1000 repeats the measurements of non-uniformity each time the measurement exceeds the threshold for non-uniformity, until a measurement is taken at all of the relative rotational positions (in this example, three). In other words, if non-uniformity is measured at all three of the relative rotational positions illustrated in FIGS. 2A-2C and is found to exceed the non-uniformity threshold at all three, process 1000 will proceed to block 1060 and answer the query (m=n?) affirmatively, then proceeding to block 1080.

At block 1080, an installation position may be determined for the tire 102 upon the wheel 104, in a different relative rotational position than each of the relative rotational positions which were measured in blocks 1030-1040-1060-1070. Moreover, as noted above, the installation position may be determined using the measurements taken at each of the three relative rotational positions, such that the installation position is responsive to the non-uniformity determined at each of the relative rotational positions. Any process that is convenient for minimizing overall non-uniformity of the assembly 100 may be used to determine an installation position of the tire 102 relative to the wheel 104, although more specific examples are provided below.

Process 1000 may then proceed to block 1090, where installation of the tire 102 with respect to the wheel 104 is finalized, e.g., with any post-processing step(s) that may be convenient.

In process 1000, additional measurement(s) of non-uniformity may occur, e.g., in block 1090, to determine whether additional processing may be needed of the assembly 100 based upon measured levels of non-uniformity. For example, process 1000 may determine whether installation is finalized at the present wheel/tire relative rotational position, or whether additional "re-work" of the assembly 100 is recommended. In cases where non-uniformity thresholds are exceeded despite the measurements and angular movement of the tire 102 relative to the wheel 104, the tire 102 may be moved to one or more additional angular positions relative to the wheel 104 and the assembly 100 may be re-measured for non-uniformity, and the predictive equations discussed above may be updated accordingly. In other cases, e.g., where measured non-uniformity is significantly above a given threshold or otherwise extreme, the tire 102 may be dismounted from the wheel 104, and each of the tire 102 and wheel 104 may be re-introduced into a wheel/tire assembly process with different paired parts. In some particularly extreme cases of non-uniformity, one or both of the tire 102 and the wheel 104 may be discarded. Process 1000 may then terminate.

As noted above, in block 1080 of process 1000 any method may be employed that is convenient for determining a position of the tire 102 on the wheel 104 that minimizes overall non-uniformity of the assembly 100, e.g., due to (a) variances of the tire 102, (b) variances of the wheel 104, and (c) variances in the process of installing the tire 102 to the wheel 104. Generally, the use of a minimum of three different relative rotational positions may facilitate solving for each of these three contributions to non-uniformity of the assembly 100.

Amplitude and phase of non-uniformity of the tire and the wheel may be determined. Example approaches may thus be analogous to using a regression analysis for determining non-uniformity, and a relative rotational position of the tire 102 on the wheel 104 that minimizes non-uniformity. By using three different measurements of the assembly 100 with the tire 102 at different relative rotational positions on the wheel 104, a least-squares fit may be used to determine a third variable representing variance in the process of mounting the tire 102 on the wheel 104. Accordingly, the multiple measurements may generally determine a "wheel contribution phasor" describing variance in the wheel itself, a "tire contribution phasor" describing variance in the tire itself, and a metric of superposition adequacy describing variance in the installation of the tire 102 to the wheel 104.

In the examples herein where variance is determined based upon wheel contributions, tire contributions, and process contributions (i.e., from the process of installing the tire 102 to the wheel 104), the wheel and tire contributions may be modeled in a matrix as generally unknown complex quantities (wheel and tire phasors), while the assembly variance is modeled as a separate, uncontrolled, random source.

Merely as one example, wheel, tire, and installation contributions may be expressed as matrices in a Multiple-Input/Single-Output relationship. In an example approach, the complex wheel and tire phasors may be organized as matrix "X," below, in equation (1a):

$$X = \begin{bmatrix} X_{11} & X_{12} \\ X_{21} & X_{22} \\ \vdots & \vdots \\ X_{m1} & X_{m2} \end{bmatrix} \quad H = \begin{bmatrix} H_1 \\ H_2 \end{bmatrix} \quad Y = \begin{bmatrix} Y_1 \\ Y_2 \\ \vdots \\ Y_m \end{bmatrix} \quad (1a)$$

The complex quantities "X" may have an amplitude of unity (i.e., 1), with phases at the predefined intermediate installation angles (i.e., 0 degrees, 120 degrees, and 240 degrees in the examples illustrated in FIGS. 2A-2C). Accordingly, the "X" matrix is illustrated in equations 1a and 1b with two columns—a first column for the tire, and a second column for the wheel, with each row representing an individual measurement. In other words, a tire angle and a wheel angle for that particular measurement of non-uniformity of the assembly may be represented. The first subscript of the X variable identifies the distinct angular measurement position, while the second subscript identifies the variable, i.e., tire or wheel (e.g., "1"=tire, "2"=wheel).

The values for the "Y" matrix are also complex, which represent the measured non-uniformity metric, e.g., radial first harmonic force or radial runout. The phase reference for the Y and X matrices can have an arbitrary origin, but generally must be identical for all measurements. For example, all measurements relative to a particular reference feature, e.g., reference features 114/116, or a feature of the wheel or tire such as the valve hole of the wheel and a label on the tire. In this manner, angular references for the tire 102 and wheel 104 may be kept consistent.

The "H" matrix illustrated above may generally represent the unknowns and the contributions of the wheel and tire respectively. The H matrix may, in this example, be a single column, two-row array. The unknowns may be solved for in the following treatments—the amplitudes of the "H" values will represent the level of the non-uniformity metric attributable to that part (i.e., the wheel or tire), and the phase will represent the location along the circumference.

H will only have 2 possible complex values—one for the tire and the other for the wheel. The top entry corresponds to the value associated with the 1$^{st}$ column of the X matrix. For example, if this column represents the tire, this will be the column of quantities of complex values: $e^{i\theta_p}$, where $\theta_p$ is the tire angular position of the p angular orientation. The observation number is "p," or the distinct angular orientation of the tire.

Equation (1a) is illustrated below in an alternate manner as equation (1b), with the "t" and "w" subscripts identifying the tire (t) and wheel (w), respectively. The numeric subscripts identify the angular orientation (each observation number, or distinct angular orientation of the tire and wheel):

$$X = \begin{bmatrix} X_{1t} & X_{1w} \\ X_{2t} & X_{2w} \\ \vdots & \vdots \\ X_{mt} & X_{mw} \end{bmatrix} \quad H = \begin{bmatrix} H_t \\ H_w \end{bmatrix} \quad Y = \begin{bmatrix} Y_1 \\ Y_2 \\ \vdots \\ Y_m \end{bmatrix} \quad (1b)$$

It should be noted that when solving for first-order (harmonic) responses, the phase and the angle along the circumference are generally identical. However, for higher orders, i.e., when the order is greater than or equal to two, the physical angle is the angle along the period, viz, $2\pi$, divided by the order number k.

It should be noted that the "X," "Y" and "H" values are complex, and may be expressed as:

$$a * e^{i\theta}$$

The use of three separate positions where measurements are taken (e.g., at the relative rotational positions illustrated in FIGS. 2A-2C) may facilitate quantification of noise due to the relatively random effect of variance in the process of mounting the tire 102 to the wheel 104. Thus, if there are only two rows of data (i.e., obtained from only two measurements, instead of three measurements as in the example approaches herein), while the equations can be directly solved for the two unknowns, the random effect of the tire mounting variance may lead to erroneous results.

With regard to cross-products of the individual x-phasors, a "t-transpose-t" element of the X-transpose-X matrix may be represented below (continuing with the example equation 1b) as "$G_{tt}$," while a "t-transpose-w" element of the X-transpose-X matrix is represented below by "$G_{tt}$." The X-transpose-X matrix with the individual elements are created by multiplying the conjugate transpose of the X matrix with the X matrix. The quantities $G_{tt}$, $G_{tw}$, $G_{wt}$ and $G_{ww}$ below represent sums of conjugated cross-products between the X phasors and are also complex values in equation (2a). A "t-transpose-y" element of the X-transpose-Y matrix may be represented below as "$G_{ty}$," while a "w-transpose-y" element of the X-transpose-Y matrix is represented below by "$G_{wy}$":

$$\begin{bmatrix} G_{ty} \\ G_{wy} \end{bmatrix} = \begin{bmatrix} G_{tt} & G_{tw} \\ G_{wt} & G_{ww} \end{bmatrix} \begin{bmatrix} H_t \\ H_w \end{bmatrix} \quad (2a)$$

where $\begin{bmatrix} G_{tt} & G_{tw} \\ G_{wt} & G_{ww} \end{bmatrix}$ is the $X$-transpose-$X$ matrix and $\begin{bmatrix} G_{ty} \\ G_{wy} \end{bmatrix}$ is the $X$-transpose-$Y$ matrix Continuing with this example, solving for $H_s$ in (2a) yields:

$$\begin{bmatrix} H_t \\ H_w \end{bmatrix} = \begin{bmatrix} G_{tt} & G_{tw} \\ G_{wt} & G_{ww} \end{bmatrix}^{-1} \begin{bmatrix} G_{ty} \\ G_{wy} \end{bmatrix} \quad (2b)$$

In equation 2b, the tire and wheel phasor contributions are represented as $H_t$ and $H_w$, respectively. The cross-product terms of all matrices may be normalized by the number of measurements m, or may be used without normalization. However, identical treatment should be applied to all terms, i.e., all terms should be normalized or all terms should be not normalized.

After finding $H_t$ and $H_w$, one can produce the estimated assembly phasor at any angular orientation as:

$$Y_{predicted} = [e^{i\Theta_t} \ e^{i\Theta_w}] \begin{bmatrix} H_t \\ H_w \end{bmatrix} \quad (3)$$

Here, it is desired to identify the minimum value of the summation of the tire and wheel phasors. The minimum scalar value of the predicted response is the absolute value of the difference between the magnitudes of the H values, or:

$$Min(|Y_{predicted}|) = abs(|Ht| - |Hw|) \quad (4)$$

The vertical bars also indicate absolute value in equation (4). The minimum occurs when the 2 phasors are directly opposed, or, arg(Ht)−arg(Hw)=π, thereby enabling the calculation of the optimal relative angle between the tire and the wheel.

To estimate contamination of the measurements by the random mounting influence, we may calculate the multiple coherence using the following matrices:

$$G_{yxx} = \begin{bmatrix} G_{yy} & G_{yt} & G_{yw} \\ G_{ty} & G_{tt} & G_{tw} \\ G_{wy} & G_{wt} & G_{ww} \end{bmatrix} \quad (5)$$

And, using the following definitions:

$G_{xx} = \begin{bmatrix} G_{tt} & G_{tw} \\ G_{wt} & G_{ww} \end{bmatrix}$ (reused from equation 2a above)

$G_{yy}$=(conj(Y'))*Y (sum of products of conjugates of Y with Y)

conj=conjugate and "'" (single apostrophe) is transpose operation

The multiple coherence is then represented by equation 6, below:

$$\gamma^2 = 1 - \left( \frac{|G_{yxx}|}{G_{yy}|G_{xx}|} \right) \quad (6)$$

It should be noted that the vertical bars in equation (6) indicate a determinant of the matrix. As determinants are scalar quantities, this leads to a scalar value for the coherence (analagous to $r^2$ in scalar multiple regression analysis).

Accordingly, the interpretation of results from the foregoing matrix examples may be similar, e.g., the fit of the model is very good as coherence values approach unity, and the fit is not good where the values approach zero. Additionally, magnitude of the coherence values may generally represent a ratio of the explained energy to the total measured energy, thereby simultaneously quantifying the "error" quantity (where energy is the mean square of variable Y, and coherence is the ratio of (1) estimated energy Y calculated from the matrices H & X to (2) measured energy Y).

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of installing tires to corresponding wheels, comprising:

(a) measuring a non-uniformity of a first assembled tire and wheel with the tire positioned relative to the wheel at a first relative rotational position to determine a first measurement of non-uniformity according to a predetermined metric;

(b) determining that the first measurement is above a predetermined non-uniformity limit;

(c) based upon the determination in step (b), rotating the tire with respect to the wheel to a second relative rotational position;

(d) measuring a non-uniformity of the assembled tire and wheel with the tire positioned relative to the wheel at the second relative rotational position to determine a second measurement of non-uniformity according to the predetermined metric;

(e) determining that the second measurement is above the predetermined non-uniformity limit;

(f) based upon the determination in step (e), rotating the tire with respect to the wheel to at least a third relative rotational position, wherein each of the first, second, and at least third relative rotational positions of the tire are at different locations about the wheel;

(g) measuring a non-uniformity of the assembled tire and wheel with the tire positioned relative to the wheel at the at least third relative rotational position(s) to determine at least a third measurement of non-uniformity according to the predetermined metric;

(h) determining that the third measurement is above the predetermined non-uniformity limit; and (i) installing the tire on the wheel at a rotationally relative installation position determined from at least the first, second, and third measurements, the position of the tire relative to the wheel in the rotationally relative installation position being different from each of the first, second, and third relative rotational positions.

2. The method of claim 1, wherein the predetermined metric is a metric of radial non-uniformity.

3. The method of claim 1, wherein the predetermined metric is one of a runout distance of the assembly in a radial direction of the tire, a radial force variation (RFV) measured while the assembly is rotated, a lateral force variation (LFV) measured while the assembly is rotated, a fore-aft force variation (FFV) measured while the assembly is rotated, and a rolling radius variation measured while the assembly is rotated.

4. The method of claim 3, further comprising measuring a non-uniformity of at least a second assembled tire and wheel and concluding measuring the non-uniformity of the second assembled tire and wheel by determining that a measurement of radial non-uniformity of the second tire and wheel is below the predetermined non-uniformity limit.

5. The method of claim 1, wherein the first, second, and third relative rotational positions are spaced substantially equally about the circumference of the wheel.

6. The method of claim 1, further comprising determining a wheel contribution to the determined non-uniformity, a tire contribution to the determined non-uniformity, and a wheel-tire assembly contribution.

7. The method of claim 1, wherein installing the tire on the wheel at the rotationally relative installation position includes rotating the tire with respect to the wheel.

8. The method of claim 1, wherein installing the tire on the wheel at the rotationally relative installation position includes deflating the tire and rotating the tire around the wheel without de-beading the tire from the wheel.

9. The method of claim 1, wherein the determining of the rotationally relative installation position comprises determining an angular orientation of the tire on the wheel corresponding to a calculated lowest non-uniformity determined from at least each of the first, second, and third measurements.

10. A method of installing tires to corresponding wheels, comprising:

(a) measuring a radial non-uniformity of a first assembled tire and wheel with the tire positioned relative to the wheel at a first relative rotational position to determine a first measurement of radial non-uniformity according to a predetermined metric;

(b) determining that the first measurement is above a predetermined non-uniformity limit;

(c) based upon the determination in step (b), rotating the tire with respect to the wheel to a second relative rotational position;

(d) measuring a radial non-uniformity of the assembled tire and wheel with the tire positioned relative to the wheel at the second relative rotational position to determine a second measurement of radial non-uniformity according to the predetermined metric;

(e) determining that the second measurement is above the predetermined non-uniformity limit;

(f) based upon the determination in step (e), rotating the tire with respect to the wheel to at least a third relative rotational position, wherein each of the first, second, and at least third relative rotational positions of the tire are at different locations about the wheel;

(g) measuring a radial non-uniformity of the assembled tire and wheel with the tire positioned relative to the wheel at the third relative rotational position to determine at least a third measurement of radial non-uniformity according to the predetermined metric;

(h) determining that the third measurement is above the predetermined non-uniformity limit; and (i) installing the tire on the wheel at a rotationally relative installation position determined from at least the first, second, and third measurements, the position of the tire relative to the wheel in the rotationally relative installation position being different from each of the first, second, and third relative rotational positions.

11. The method of claim 10, wherein the predetermined metric is one of a runout distance of the tire in a radial direction of the tire and a radial force variation (RFV) measured while the tire is rotated.

12. The method of claim 10, further comprising measuring a non-uniformity of at least a second assembled tire and wheel and concluding measuring the non-uniformity of the second assembled tire and wheel by determining that a measurement of radial non-uniformity of the second tire and wheel is below the predetermined non-uniformity limit.

13. The method of claim 10, wherein the first, second, and third relative rotational positions are spaced substantially equally about the circumference of the wheel.

14. The method of claim 10, wherein the determining of the rotationally relative installation position comprises determining an angular orientation of the tire on the wheel corresponding to a calculated lowest non-uniformity determined from at least each of the first, second, and third measurements.

15. The method of claim 10, wherein installing the tire on the wheel at the rotationally relative installation position includes rotating the tire with respect to the wheel.

16. A method of installing tires to corresponding wheels, comprising:

(a) measuring a non-uniformity of a first assembled tire and wheel with the tire positioned relative to the wheel at a first relative rotational position to determine a first measurement of non-uniformity according to a predetermined metric;
(b) determining that the first measurement is above a predetermined non-uniformity limit;
(c) based upon the determination in step (b), rotating the tire with respect to the wheel to a second relative rotational position;
(d) measuring a non-uniformity of the assembled tire and wheel with the tire positioned relative to the wheel at the second relative rotational position to determine a second measurement of non-uniformity according to the predetermined metric;
(e) determining that the second measurement is above the predetermined non-uniformity limit;
(f) based upon the determination in step (e), rotating the tire with respect to the wheel to at least a third relative rotational position, wherein each of the first, second, and at least third relative rotational positions of the tire are at different locations about the wheel;
(g) measuring a non-uniformity of the assembled tire and wheel with the tire positioned relative to the wheel at the third relative rotational position to determine at least a third measurement of non-uniformity according to the predetermined metric;
(h) determining that the third measurement is above the predetermined non-uniformity limit;
(i) installing the tire on the wheel at a rotationally relative installation position determined from at least the first, second, and third measurements, the position of the tire relative to the wheel in the rotationally relative installation position being different from each of the first, second, and third relative rotational positions;
(j) measuring a non-uniformity of at least a second assembled tire and wheel, and concluding measuring the non-uniformity of the second assembled tire and wheel by determining that a measurement of radial non-uniformity of the second tire and wheel is below the predetermined non-uniformity limit.

17. The method of claim 16, wherein the predetermined metric is a metric of radial non-uniformity, and wherein the first, second, and third relative rotational positions are spaced substantially equally about the circumference of the wheel.

18. The method of claim 16, wherein the predetermined metric is one of a runout distance of the first assembly in a radial direction of the first tire, a radial force variation (RFV) measured while the first assembly is rotated, a lateral force variation (LFV) measured while the first assembly is rotated, a fore-aft force variation (FFV) measured while the first assembly is rotated, and a rolling radius variation measured while the first tire is rotated.

19. The method of claim 16, wherein the determining of the rotationally relative installation position comprises determining an angular orientation of the tire on the wheel corresponding to a calculated lowest non-uniformity determined from at least each of the first, second, and third measurements.

* * * * *